April 1, 1958

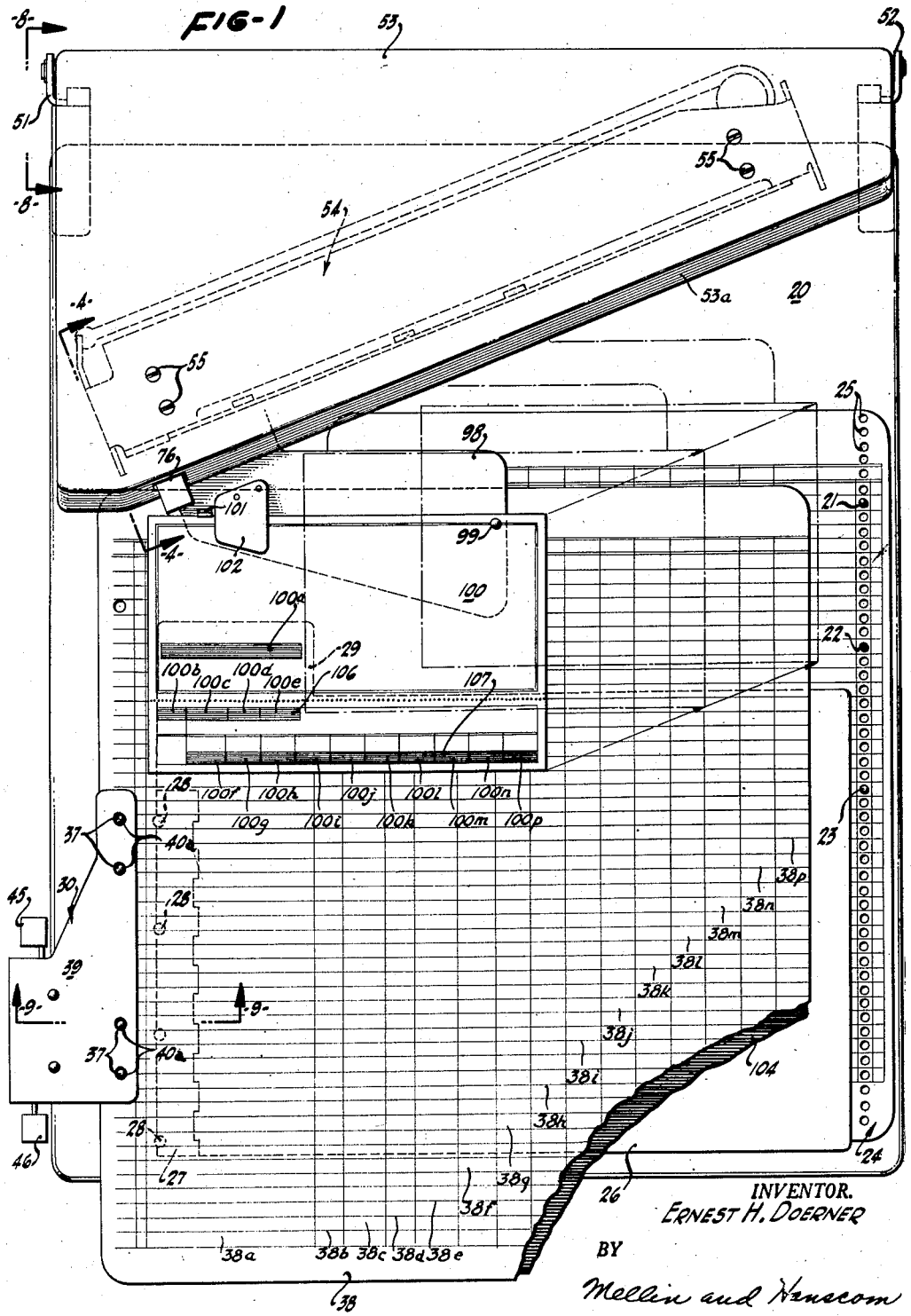

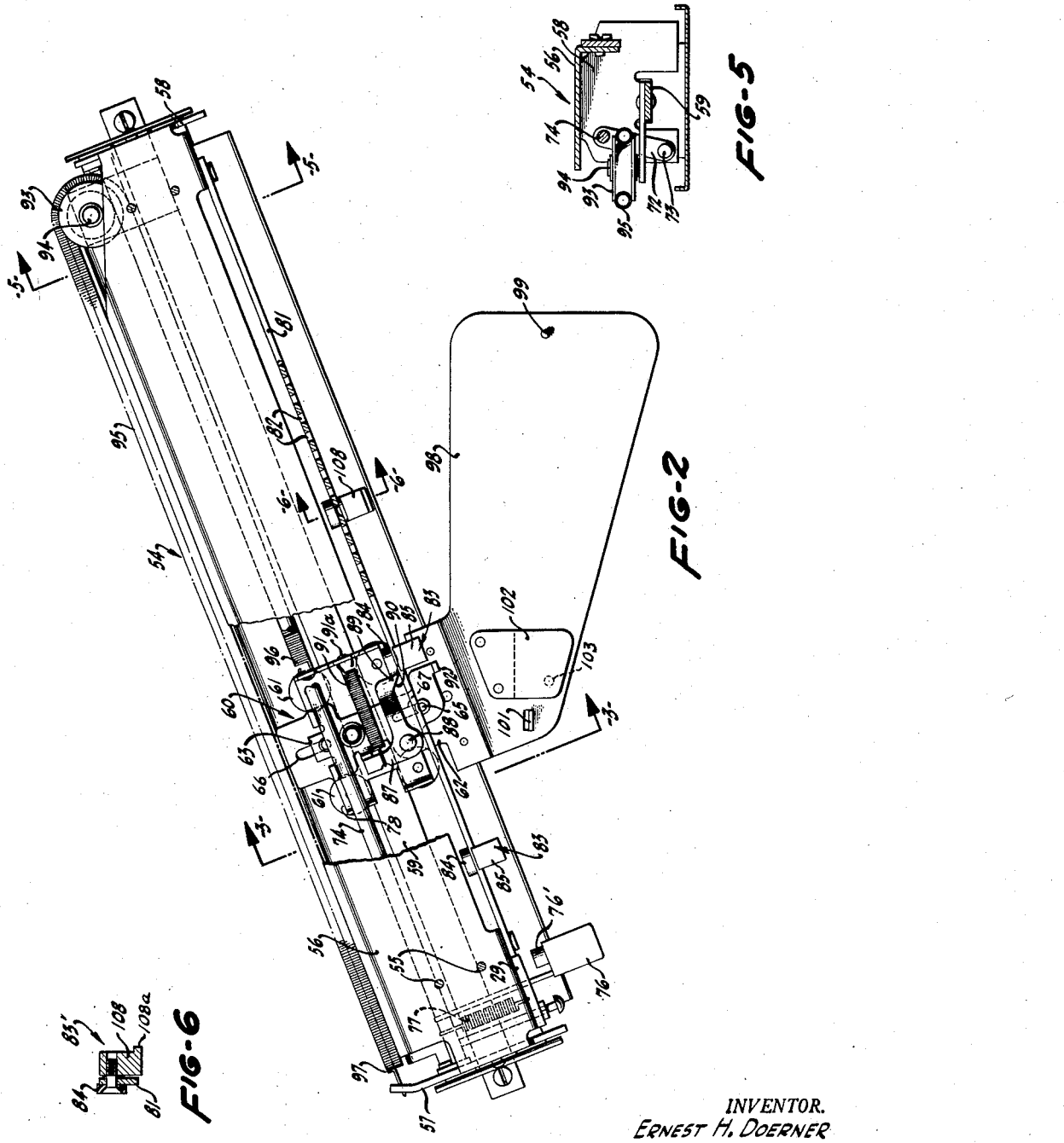

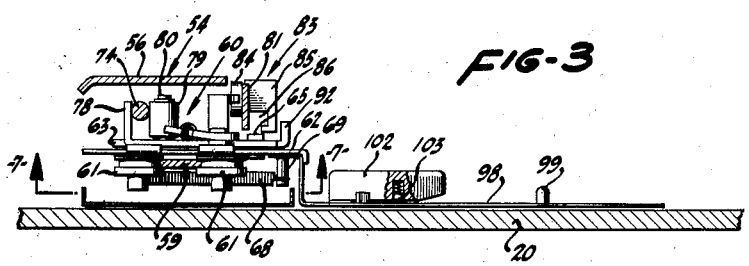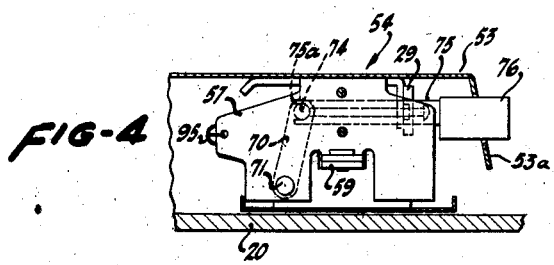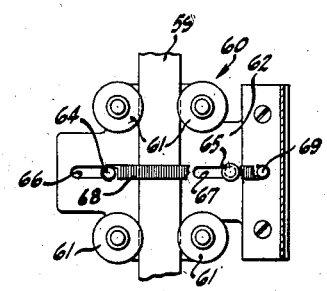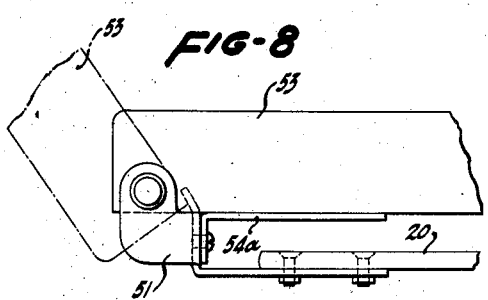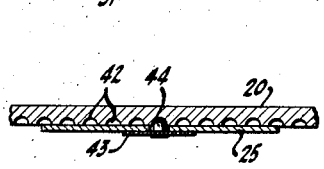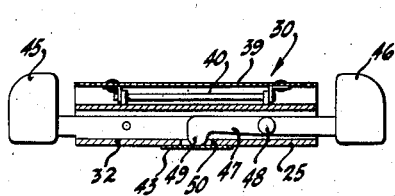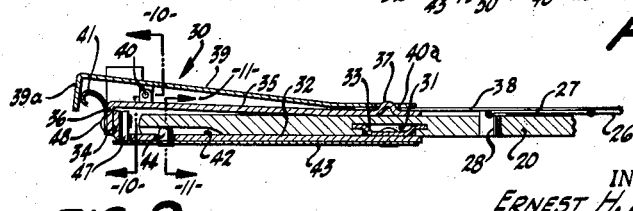

E. H. DOERNER 2,828,977

POSTING BOARD

Filed Oct. 28, 1955

INVENTOR.
ERNEST H. DOERNER
BY
Mellin and Hanscom
ATTORNEYS

United States Patent Office 2,828,977
Patented Apr. 1, 1958

2,828,977

POSTING BOARD

Ernest H. Doerner, Athens, Ohio, assignor to Royal McBee Corporation, New York, N. Y., a corporation of New York Application October 28, 1955, Serial No. 543,346

3 Claims. (Cl. 282—29)

This invention relates to a posting board and more particularly to a board used for collating several forms; for example, a payroll ledger and a journal sheet whereon the entries are made horizontally across, and an itemized check stub whereon the entries are made in several different lines one above the other and wherein the entries may be made on all of the sheets simultaneously with the carbon.

It is the principal object of this invention to provide a posting board having a carriage which moves diagonally of the device, whereby entries may be made in several lines one above the other on a check stub mounted on the carriage and simultaneously, through the use of carbon, posted horizontally on an account or journal sheet or both.

A further object of this invention is to provide a posting board according to the preceding object, wherein the guide for holding the journal sheet is movable forwardly and rearwardly of the board to bring the first unposted line of the journal sheet into register with the posting line of the board, wherein the diagonal carriage is guided for diagonal movement relative to the board to successively bring the various posting lines of the check stub into register with the horizontal posting line of the device, and wherein means are provided to facilitate the mounting of the account sheet beneath the journal sheet with the first unposted line thereof in register with the posting line of the board.

A preferred embodiment of the invention is described in the following detailed specification, and illustrated by way of example in the accompanying drawings, wherein:

Fig. 1 is a plan view of a posting board constructed in accordance with the principles of the invention.

Fig. 2 is a partial plan view partially broken away and illustrating some of the details of the traveling carriage.

Figure 12:
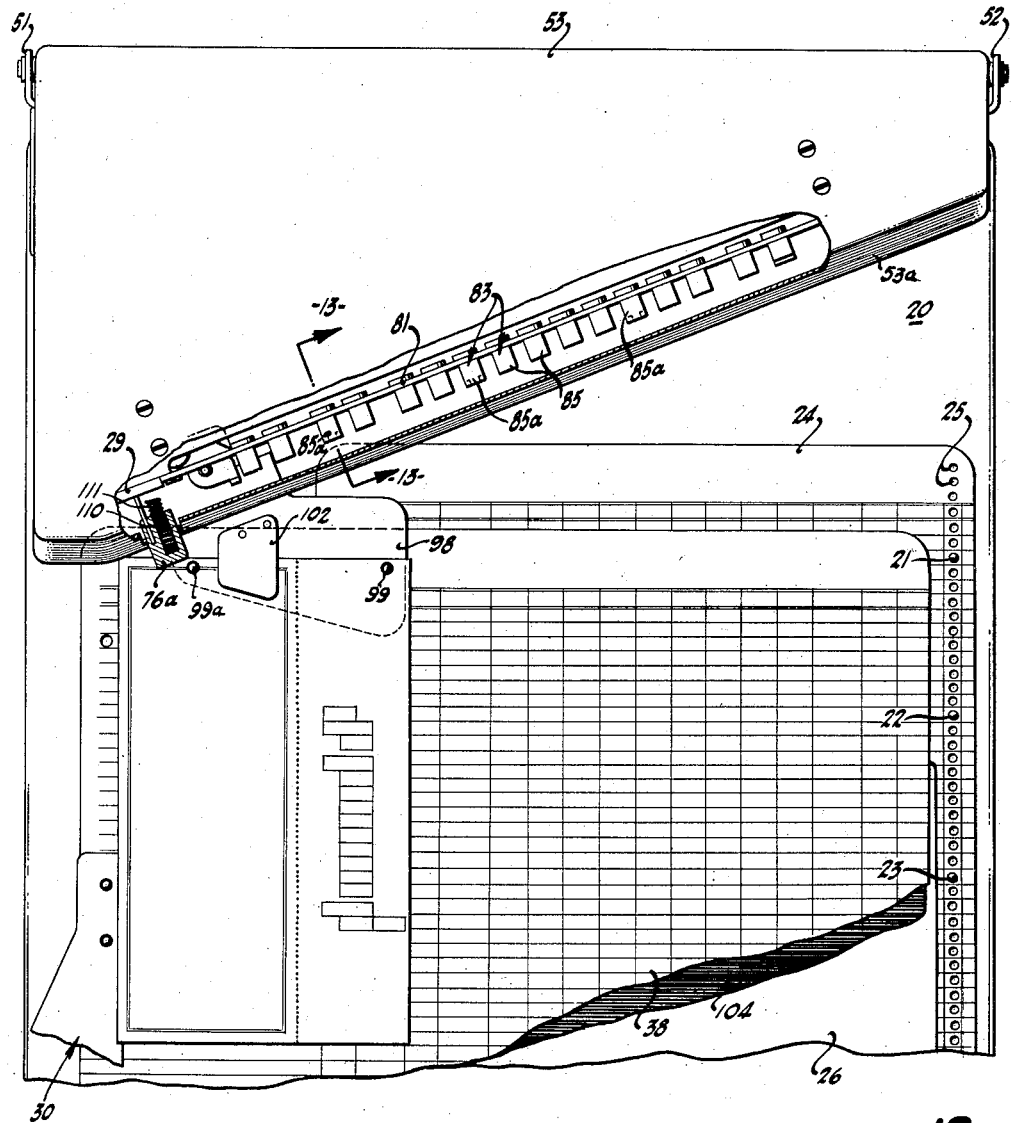
Figure 13:
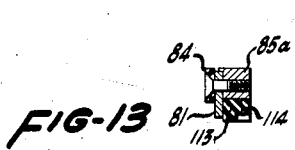
Figure 14:
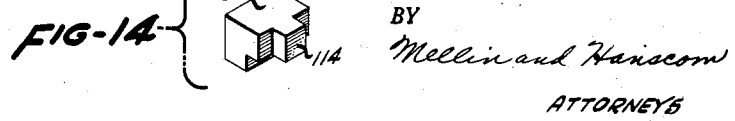

Fig. 3 is a sectional view taken on line 3—3 of Fig. 2.
Fig. 4 is a sectional view taken on line 4—4 of Fig. 1.
Fig. 5 is a sectional view taken on line 5—5 of Fig. 2.
Fig. 6 is a sectional view taken on line 6—6 of Fig. 2.
Fig. 7 is a sectional view taken on line 7—7 of Fig. 3.
Fig. 8 is a sectional view taken on line 8—8 of Fig. 1.
Fig. 9 is a sectional view taken on line 9—9 of Fig. 1.
Fig. 10 is a sectional view taken on line 10—10 of Fig. 9.
Fig. 11 is a sectional view taken on line 11—11 of Fig. 9.
Fig. 12 is a plan view of a modified form of the device.
Fig. 13 is a sectional view taken on line 13—13 of Fig. 12.
Fig. 14 is an exploded view of one of the skip stops.

Referring now to the drawings, wherein the same reference numerals are used to designate the same elements throughout the various views shown, the reference numeral 20 indicates a flat board member adapted to be supported on a desk or table top by any suitable supporting means (not shown) fixed to the underside thereof. Three pins 21, 22 and 23 are fixed to the board 20 adjacent the right-hand edge thereof at equally spaced points along said edge thereof. The center pin 22 of the three pins is made of a material of contrasting color to the other two pins 21 and 23 to serve as an indexing pin, and indicates the posting line of the device. An account card 24, having a plurality of holes 25 spaced vertically along the right-hand edge thereof, is adapted to lie on the upper surface of the board 20 with the three pins 21, 22 and 23 extending through three of the holes 25. The holes 25 are located one for each horizontal line of the account card 24. When the card is positioned on the board 20, the pin 22 is inserted through the hole 25 in the first unposted line thereof, thus automatically positioning the account card for posting thereof.

A shield 26 is hingedly mounted adjacent its left end to a plate 27, which in turn is hingedly mounted adjacent its left edge to a plurality of pins 28. The pins 28 extend upwardly from the board 20 adjacent the left edge thereof. The shield 26 extends rearwardly from the lower end of the board to a point just below the posting line of the machine, and said shield 26 overlies the record card 24 for purposes which will hereinafter be described.

A journal holding assembly, generally indicated at 30, is slidably mounted adjacent the left edge of the board 20. As can be seen in Fig. 9, the board 20 is provided with a dovetail slot 31 formed in its lower surface and extending parallel to the left edge of the board. The base 32 of the journal holding assembly 30 underlies the board 20 and is provided with an upwardly extending member 33 having lateral flanges which extend into the dovetail slot 31 to slidably mount the assembly 30 relative to the board 20. The outer end of the base member 32 is turned upwardly to form a flange as indicated at 34. An upper plate 35 overlies the upper surface of the board 20, and is provided with a downwardly turned flange 36 fastened to the upwardly turned flange 34 on the base plate 32. The upper plate 35 is provided with a plurality of spaced upwardly projecting dimples 37 adapted to project through suitably spaced apertures formed adjacent the left edge of a journal sheet 38. A sheet holding member 39 is hingedly mounted to the upper plate 35 by means of a pivot shaft 40 extending longitudinally of the board 20. The plate 39 is provided with a plurality of holes 40a adapted to receive the upwardly projecting dimples 37 to retain the journal sheet 38 thereon. The outer edge of the plate 39 is provided with a depending flange 39a, the inner surface of which is in contact with the coiled end of a flat spring 41 fixed to the flange 34 on the lower plate 32. The spring 41 acts to retain the plate 39 in its closed position.

As seen in Figs. 9 and 11, the board 20 is provided adjacent its left edge with a plurality of horizontally extending grooves 42. A flat leaf spring 43 is connected adjacent one of its ends to the lower surface of the bottom plate 32 adjacent the innermost end thereof. The spring member 43 extends outwardly and is provided adjacent its outer end with an upwardly extending pin 44 adapted to be selectively received in one of the grooves 42.

Referring now to Fig. 10, a pair of handles 45 and 46 extend rearwardly and forwardly from the assembly 30. The handle 45 is fixed with relation to the assembly. The handle 46 is attached to one end of an arm 47 pivotally mounted on a pin 48 fixed to the flange 34 of the lower plate 32. The opposite end of the arm 47 is formed with a downwardly extending nose portion 49 extending through a suitable aperture 50 provided in the base plate 32. The nose portion 49 bears against the upper surface of the outer end of the spring member 43 whereby upward movement of the handle 46 will press the spring 43 to release the pin 44 from the groove 42 to permit longitudinal movement of the sheet holding assembly 30 relative to the board 20. When the handle 46 is released, the pin 44 will again be projected into one of the grooves 42 to retain the sheet holding assembly 30 in its selected position.

As best seen in Figs. 1 and 8, a pair of brackets 51 and 52 are located one adjacent each of the rear corners of the board 20 and extend rearwardly and upwadly therefrom. A housing 53, generally triangular in shape is pivotally mounted between the brackets 51 and 52 for rotation about an axis parallel to, but spaced rearwardly and upwardly from, the rear edge of the board 20. A stop member 54a is connected to the bracket 51 and extends forwardly therefrom parallel to, and spaced upwardly from, the upper surface of the board 20, whereby when the housing 53 is in its lowermost position, the bottom edge will contact the stop member 54a to support the housing 53 parallel to, but spaced upwardly from, the board 20.

A carriage guide assembly 54 is fixed to the underside of the housing 53 by a plurality of bolts 55. The carriage guide 54 extends parallel to the diagonal front face 53a of the housing 53. The carriage guide assembly 54 comprises guide frame 56 in the form of a horizontal plate extending substantially the full length of the diagonal front edge of the housing 53. The left end of the plate 56 is bent downwardly to form a track supporting flange 57 in the manner shown in Fig. 4. Similarly, the plate 56 is bent downwardly at its right end to form a downwardly extending track supporting flange 58 in the manner shown in Fig. 5. A carriage track 59 extends between the two flanges 57 and 58 and is supported thereby at its opposite ends.

A carriage assembly, generally indicated at 60, is mounted on the track 59 for movement parallel to the diagonal front edge of the housing 53 by four grooved rollers 61. The latter are rotatably mounted on shafts fixed to the frame 62 of the carriage 60 and grip the side edges of the track 59. A slide mechanism 63 is mounted adjacent the upper surface of the carriage frame 62 for lateral movement with respect thereto. The slide 63 is held to the frame 62 and guided for lateral movement with respect thereto by a pair of pins 64 and 65 fixed to the slide 63 and extending downwardly through elongated slots 66 and 67, respectively, formed in the carriage frame 62.

As can best be seen in Figs. 3 and 7, a tension spring 68 is connected between the lower end of the pin 64 and a pin 69 fixed to the carriage frame 62, whereby the slide 63 is normally urged to the right as viewed in Figs. 3 and 7 or, in other words, toward the front of the housing 53.

As seen in Fig. 4, a crank arm 70 is pivotally mounted adjacent the inner surface of the flange 57 by means of a pin 71 adjacent the lower end thereof. Similarly, a crank arm 72 is pivotally mounted adjacent the inner face of the flange 58 by a pin 73, in the manner shown in Fig. 5. A slide shifting rod 74 is fixed at its opposite ends to the upper ends of cranks 70 and 72, respectively. A rod 75 is mounted in suitable guides in the carriage guide assembly 54 adjacent the left edge thereof and is provided with a bifurcated end 75a embracing the rod 74. A push-button 76 is fastened to the outer end of the rod 75 and extends outwardly through the front portion of the housing 53 whereby, by pressing the button 76, the slide shifting rod 74 will be rotated backwardly about the axis of the pins 71 and 73, respectively. Fastened between the rod 74 and the front portion of the carriage guide 54 is a tension spring 77 for returning the rod 74 to its initial position when the button 76 is released. A stop 76' fixed to the inner end of the button 76 is adapted to strike a plate 29 fixed to the carriage guide 54 and limit the amount of rearward travel of the button 76.

Referring again now to Fig. 3, the slide 63 is provided with an upwardly extending tang 78 adapted to contact the rear surface of the rod 74, and a roller 79 rotatably mounted on a pin 80 extending upwardly from the slide 63. The roller is adapted to contact the forward surface of the rod 74, whereby rearward and forward movement of the rod 74 causes the slide 63 to move rearwardly and forwardly relative to the carriage frame 62.

A rod 81, fixed at its opposite ends to the carriage guide frame 56, extends parallel to the track 59. A plurality of apertures 82 are formed in the rod 81 at spaced points therealong, and suitable tabulating stops 83 are fixed in selected ones of the apertures 82. As best seen in Fig. 3, the tabulating stops 83 comprise a round member 84, projecting inwardly from the inner surface of the rod 81, and a generally rectangular block 85 projecting outwardly from the outer surface of the rod 81. The blocks 85 are each provided with a cut-out portion 86 adjacent the lower inner corner thereof to form a groove between the block and the outer surface of the rod 81. The purpose of the grooves formed by the cut-outs 86 will be hereinafter described.

Referring now to Fig. 2, a bell crank member 87 is pivotally mounted on a pin 88 fixed to the carriage frame 62. One of the arms of the bell crank 87 extends parallel to the track 59 and the other arm extends transversely thereof. The arm which extends parallel to the track 59 is formed with an outwardly extending hook portion 89 adjacent its end. Said hook portion is adapted to contact the edge of the inwardly projecting members 84 on the tabulating stops 83 to stop the movement of the carriage to the right, as viewed in Fig. 2. The left edge of the hook 89 is beveled in the manner shown at 90, whereby the bell crank lever will rock rearwardly to permit the carriage to pass the tabulating stop members 83 when the carriage is being returned to the left as viewed in Fig. 2. A tension spring 91 is connected between the opposite leg of the bell crank lever 87 and suitable tang 91a formed on the carriage frame 62 to normally maintain the bell crank 87 in its tabulating stop engaging position.

The forward end of the slide 63 is bent upwardly to form a tang 92 normally spaced outwardly of the plane of the forward surfaces of the blocks 85 of the tabulating stops 83. The tang 92 is adapted to engage the left edges thereof, when the slide 63 is moved to its rearward position. As can be seen in Fig. 2, the right edge of the tang 92 is spaced slightly to the left of the right edge of the hook 89 (previously described) whereby when the slide 63 is moved rearwardly by pressing the button 76, the upper end of the pin 65 will contact the forward edge of the bell crank 87 to rotate the bell crank counterclockwise, as viewed in Fig. 2, to release the hook 89 from the inwardly extending member 84 of the tabulating stop 83. When the hook portion 89 releases, the carriage will move slightly to the right until the tang 92 contacts the block 85. When the button 76 is released, the tang 92 returns to its outermost position and the hook portion 89 will then contact the flat rear surface of the member 84 and permit the carriage to move therepast toward the right, as viewed in Fig. 2. As soon as the hook portion 89 clears the right edge of the member 84, it will be returned to its stop engaging position by the spring 91 and will engage the left edge of the next stop member 84 to again stop the carriage travel.

A final, or ultimate position, stop member 83', shown in Fig. 6, is utilized to end the left to right progressive movement of the carriage. This stop member is provided with a block member 108 having a forwardly extending projection 108a. In operation, the upwardly extending tang 92 of the carriage will contact the forwardly extending projection 108a of the stop member 83' and will prevent movement of the carriage therepast.

A grooved roller 93 is rotatably mounted on a vertically extending pin 94 fixed to the carriage guide frame 56 adjacent the right end thereof. A tension spring 95 is trained around the roller 93 and is fixed at one of its ends 96 to the carriage frame 62, and at its other end 97 to the flange 57 at the left end of the carriage guide frame 56, to normally urge the carriage 60 toward the right, as viewed in Fig. 2.

A check supporting member 98 is fixed to the front edge of the carriage frame 62 and extends forwardly therefrom beneath the front edge of the housing 53. Fixed to the forward edge of the check supporting member 98 and extending upwardly therefrom is a check mounting pin 99 adapted to be received within a suitable aperture formed adjacent the upper edge of the check form. The pin 99 is located adjacent the right edge of the check supporting member 98. An upwardly bent stop abutment tang 101 is formed in the check supporting member 98 adjacent the left edge thereof, and is adapted to abut the upper edge of the check form 100 to properly align the latter relative to the other papers supported on the board 20. A check form holding member 102 is fixed to the check supporting member 98, and is provided with a spring-pressed ball detent 103 adapted to press against the upper surface of the check form 100 to frictionally hold the check form in its aligned position.

In the modification shown in Fig. 12, all of the major components of the device are the same as those shown in Figs. 1 to 11. However, the button 76 is replaced by a button 76a. The button 76a is provided with a blind bore 110 at its rear surface, and a stop spring 111 is slidably received therein. The spring 111 performs the same function as the stop abutment 76' in the previous modification during normal step-by-step tabulating. However, by further pressing the button 76a, the spring 111 is compressed and the tang 92 on the carriage slide 63 is moved into alignment with the grooves formed by the cut-outs 86 in the tabulating stop blocks 85 to permit express travel of the carriage 60.

Certain of the blocks 85 are replaced with blocks 85a. The blocks 85a are provided with a slot 112 extending upwardly from their bottom edges. Rubber blocks 113, having projections 114 thereon, are mounted in the cut-outs 86a with the projections 114 received in the slots 112. The blocks 113 form express tabulating stops and are contacted by the tang 92 when the button 76a is fully depressed.

The check mounting member 98 uses a check mounting pin 99, as in the embodiment of Figs. 1 to 11, and a second check mounting pin 99a is used in place of the abutment tang 101 of the former embodiment. The check mounting pins 99 and 99a are adapted to be received within suitable apertures formed adjacent the upper edge of the check form.

In the use of the modification shown in Figs. 1 to 11, a journal sheet 38 and a carbon sheet 104 therebeneath are mounted on the dimples 37 of the assembly 30, and the carriage is moved relative to the board 20 to bring the first unposed line of the journal sheet 38 into horizontal alignment with the differently colored pin 22 on the right side of the board 20. The proper account card 24 is selected and the shield 26 is raised to permit the insertion of the account card thereunder with the first unposted line thereof in alignment with the pin 22. A blank check form 100 is mounted on the check supporting member 98 previously described. The check form 100 is provided with a space 100a for the name of the individual to whom it is to be drawn, a line 106 having approximate spaces 100b, 100c, 100d and 100e corresponding to the second, third, fourth and fifth columns 38b, 38c, 38d and 38e, respectively, of the journal sheet, and a line 107 having spaces 100f through 100p corresponding to the sixth, seventh, eighth, ninth, tenth, eleventh, thirteenth, fourteenth and fifteenth columns of the journal sheet, respectively.

The carriage 60 is moved to its extreme left-hand position, at which time the name space 100a on the check form 100 will be in register with the name column 38a at the extreme left-hand side of the journal sheet 38 and in register with the horizontal line opposite the differently colored pin 22 and the right-hand side of the board 20. The name of the person to whom the check is to be issued is copied in from the account card 24. The button 76 is then pressed to permit the carriage 60 to move the next tabulating spot, at which time the spaces 100b through 100e in the line 106 on the check stub will be in register with the columns 38b through 38e of the journal sheet 38. The line 106 will also have been moved rearwardly, so that the spaces therein are now in register with the horizontal line opposite the differently colored pin 22 at the right-hand edge of the posting board 20. After the proper entries have been entered into the appropriate spaces provided in the line 106 on the check stub, the button 76 is again pressed to permit the carriage 60 to be tabulated to the ultimate position, wherein the appropriate boxes 100f through 100p in the line 107 on the check stub will be horizontally aligned with the differently colored pin 22, and at the same time in register with the appropriate vertical columns 38f through 38p on the journal form 38. The check form 100 is then removed from the check supporting plate 98 and the carriage 60 is returned to its left-hand position. The journal carriage 30 is moved rearwardly one notch to bring the next unposted line of the journal 38 into register with the differently colored pin 22 at the right side of the board 20, the previous employee's record card 24 is removed, and the new account card to be posted is properly positioned on the pins 21, 22 and 23. A new blank check form 100 is inserted in the supporting member 98 and the operation is repeated.

The modification shown in Fig. 12 is used in the same manner as described above. However, in this modification the posting spaces on the check stub are arranged in a vertical column and the button 76a must be depressed after each individual entry. The button 76a is normally only pushed until the spring 111 contacts the stop plate 29. However, certain spaces on the check stub do not always require posting and may be bypassed by further pushing the button 76a to the express tab position, thus permitting the carriage 60 to continue its travel until the next express stop block 113 is reached which indexes the carriage to stop at the next stop washer 84. The blocks 113 are inserted at preselected positions corresponding to posting spaces which always require an entry.

While I have shown and described the preferred embodiment of my invention, it is obvious that various changes may be made by those skilled in the art, without departing from the spirit of the invention as defined in the appended claims.

Having thus described my invention, what I claim and desire to secure by Letters Patent is:

1. A posting board comprising a flat rectangular base, a plurality of pins including an indexing pin extending upwardly from said base adjacent one side edge thereof, said pins being adapted to hold a first accounting form having a plurality of pin receiving holes formed along a side edge thereof, holding means mounted adjacent the other side edge of said base for movement along said other side edge forwardly and rearwardly of said base, said holding means including an upwardly extending pin adapted to hold a second accounting form having a plurality of pin receiving holes formed along a side edge thereof, releasable latching means for retaining said holding means relative to said base at selected predetermined vertical distances from said indexing pin, a carriage, means mounting said carriage for incremental movement diagonally across said base from a first position spaced a predetermined vertical distance from said indexing pin to a second position spaced vertically farther from said indexing pin, and means including an upwardly extending pin on said carriage for holding a third accounting form having a pin receiving hole formed along a side edge thereof.

2. In a device as set forth in claim 1 further including means biasing said carriage for movement from said first position to said second position, a plurality of stop members mounted in the path of movement of said carriage intermediate said first and second position to stop the carriage movement at pre-selected points along said path of movement, and manually operable means mounted in fixed relation to said base to release said carriage from one of said stop members for movement by said biasing means to the next of said stop members.

3. In a device as set forth in claim 1 further including means biasing said carriage for movement from said first carriage position to said second carriage position, a plurality of stop members mounted in the path of movement of said carriage intermediate said first and second carriage position to stop the carriage movement at pre-selected points along said path of movement, and means including a manually operable member depressible to a first position to allow said biasing means to move said carriage from one of said stop members to the next adjacent stop member and depressible to a second position to allow said biasing means to move said carriage from one of said stop members past the next adjacent stop member to a preselected stop member.

References Cited in the file of this patent

UNITED STATES PATENTS

| | | |
|---|---|---|
| 1,512,309 | Read | Oct. 21, 1924 |
| 2,311,052 | Hurup | Feb. 16, 1943 |
| 2,598,358 | Connor | May 27, 1952 |

FOREIGN PATENTS

| | | |
|---|---|---|
| 122,802 | Austria | May 11, 1931 |
| 131,883 | Austria | Feb. 25, 1933 |